July 22, 1958 E. P. NEHER 2,844,398
RUBBER INSERT WITH LUBRICANT CHANNEL
Filed March 30, 1955 2 Sheets-Sheet 1
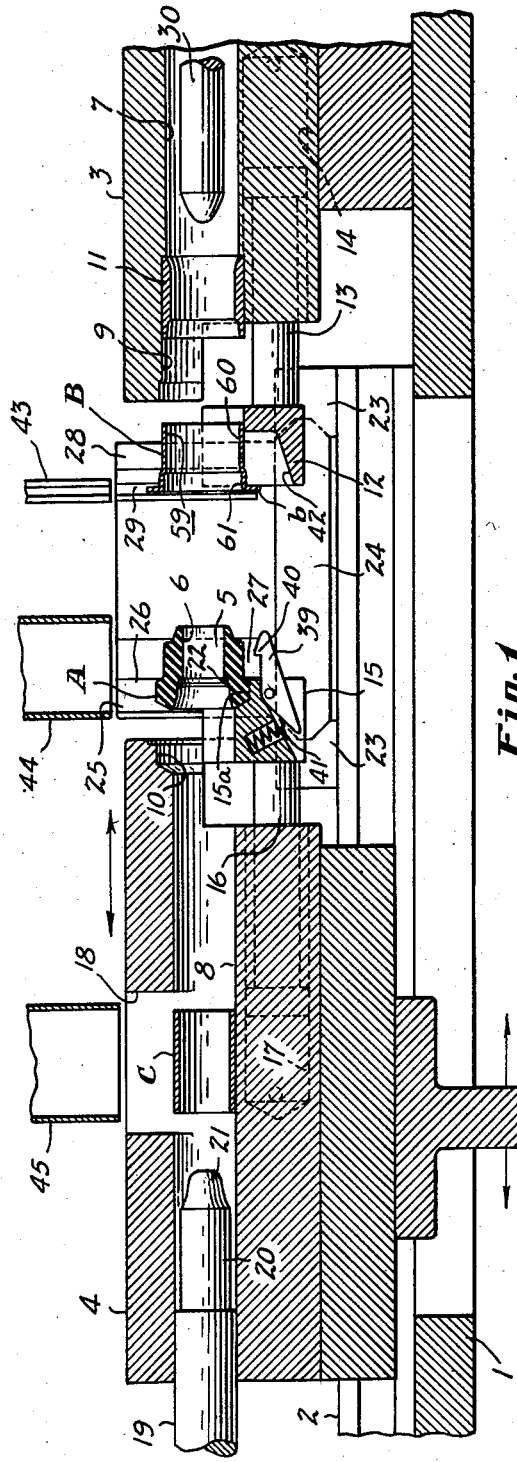
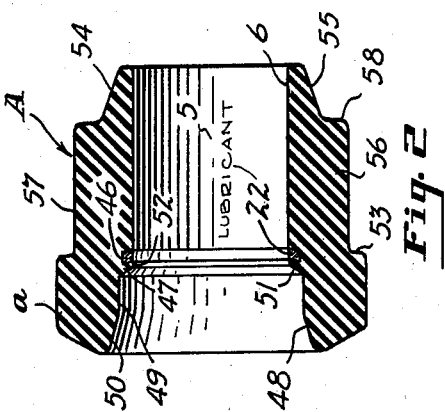
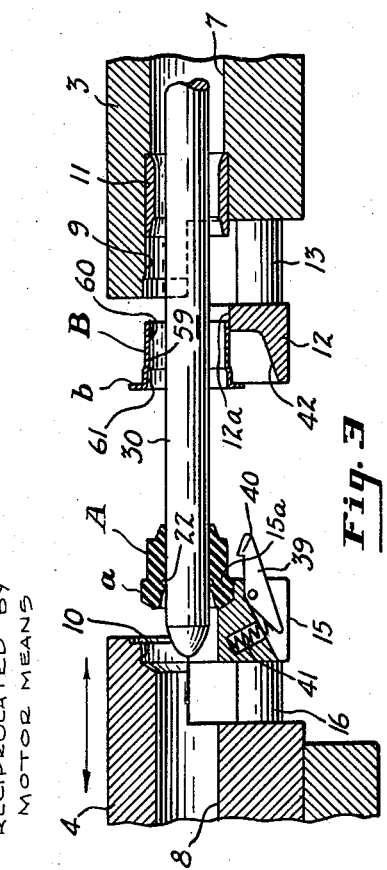
INVENTOR
Eldon Paul Neher
BY Evans + Meloy
ATTORNEYS July 22, 1958 E. P. NEHER 2,844,398
RUBBER INSERT WITH LUBRICANT CHANNEL
Filed March 30, 1955 2 Sheets-Sheet 2

INVENTOR
*Eldon Paul Neher*
BY *Evans + McCoy*
ATTORNEYS

United States Patent Office 2,844,398
Patented July 22, 1958

2,844,398

RUBBER INSERT WITH LUBRICANT CHANNEL

Eldon Paul Neher, Logansport, Ind., assignor to The General Tire and Rubber Company, Akron, Ohio, a corporation of Ohio Application March 30, 1955, Serial No. 497,932

10 Claims. (Cl. 287—85)

The present invention relates to resilient mountings and more particularly to an elastic tubular rubber insert which is positioned between an outer rigid sleeve and an inner rigid tubular core of a resilient bushing under sufficient radial compression to provide a firm frictional bond between the elastic rubber and the sleeve.

It is common practice to assemble resilient bushings by employing a tapered core pilot to expand the rubber insert prior to the entry of the core, for example as disclosed in the patent to Howard G. Beck, No. 2,660,780, issued December 1, 1953. Where such a core pilot must be removed and replaced after the assembly of each bushing, it is difficult to assemble the bushings rapidly. The present invention eliminates the need for a core pilot with an external diameter greater than the internal diameter of the rigid tubular core and facilitates high speed assembly of the resilient bushings.

According to the present invention, a tubular elastic rubber insert is provided which has an internal groove near one end thereof for supplying lubricant to the outer surface of the tubular core as it enters the insert. The groove is located so that the tubular core may enter the rubber insert without the necessity of a tapered core pilot or the like to expand the insert radially.

An object of the invention is to provide a simple elastic and deformable insert for a resilient mounting which may be assembled easily and rapidly.

A further object of the invention is to provide an elastic rubber insert having means to facilitate entry of a rigid core.

Another object of the invention is to provide a rubber insert for a resilient mounting which may be assembled at high speed in an automatic or semi-automatic machine.

Another object of the invention is to provide an improved method of assembling resilient mountings which permits easy assembly at minimum cost.

Other objects, uses and advantages of the present invention will become apparent to one skilled in the art from the following description and from the drawings, in which:

Figure 1 is a fragmentary longitudinal sectional view on a reduced scale of a machine for assembling the bushings of the present invention showing the work positioning members in work receiving position, the work pressing members in their separated positions, and the core inserting plunger in retracted position;

Figure 2 is a longitudinal vertical sectional view of the rubber insert of the present invention;

Figure 3 is a fragmentary longitudinal sectional view of the machine illustrated in Fig. 1 showing the alining pin in engagement with the tubular insert to guide it into engagement with the outer sleeve;

Figure 4:
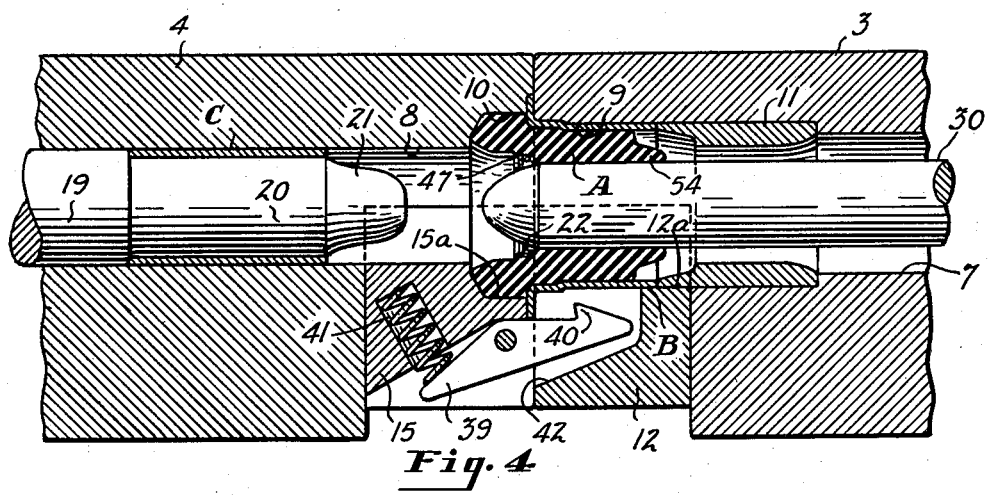
Figure 4 is a fragmentary longitudinal section through the work gripping portions of the work pressing members showing said members in closed position in clamping the sleeve and insert between them.

In the drawings like parts are identified with the same numerals throughout the several views. Each figure of the drawings is drawn substantially to scale so that the relative sizes and shapes of the various parts of the resilient bushings and of the machine for assembling such bushings will be apparent to the eye, but it will be understood that the rubber insert of the present invention and the machine for assembling the insert in a resilient mounting may have various forms quite different from those shown in the drawings.

The machine for assembling resilient mountings incorporating the elastic rubber insert of the present invention may be indentical with the machine disclosed in the copending application of Howard R. Sigler et al., Serial No. 370,783, filed July 28, 1953, entitled, "Machine for Assembling Resilient Bushings," and assigned to the assignee of the present invention. An application corresponding to said copending application was filed in France and issued as French Patent No. 1,113,088. However, it is unnecessary to employ fluid under pressure in such machine to facilitate assembly of a rigid tubular core within the rubber insert of the present invention or otherwise to expend the radially inner portion of the rubber insert before the tubular core is inserted therein. The machine shown herein is identical with the machine shown in said copending application except that the core inserting plunger and the means associated therewith for supplying fluid under pressure through the plunger are replaced by a simplified plunger which does not expand the portion of the rubber insert immediately in advance of the end edge of the tubular core as the core is advanced through the insert.

Figure 5:
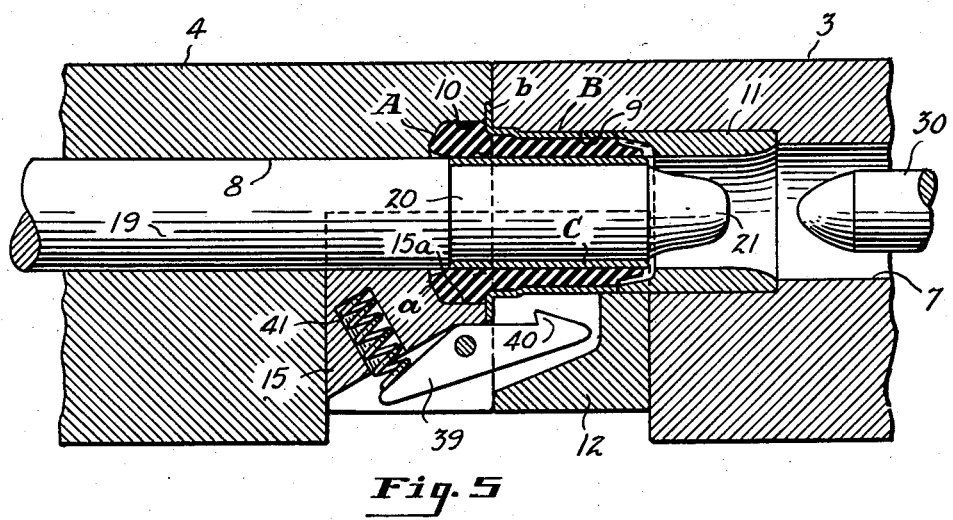
Figure 5 is a fragmentary longitudinal section similar to Fig. 4 but showing the core-inserting plunger advanced to a position where the tubular core is in place within the rubber insert.

The machine shown in the drawings is designed to assemble a resilient bushing or mounting which, as shown in Fig. 5, has a tubular insert A of elastic rubber which is disposed between an outer sleeve B and an inner tubular core C under radial compression sufficient to firmly bind both the inner rigid core and the outer rigid sleeve to the rubber. The bushing herein shown is well suited for use on vertically disposed pivots (for example, of the type shown in U. S. Patent No. 2,661,969), the sleeve B being provided with a circumferential supporting flange b at its upper end and the insert A being provided with an enlarged upper end portion a that projects above the sleeve and bears upon the flange b.

As herein illustrated, the machine is mounted on a suitable horizontal bed 1 which is provided with a longitudinal way 2 and includes a sleeve and insert-assembling press that comprises a pair of work pressing members 3 and 4 mounted on the bed 1 for relative linear movement, one toward and away from the other. As herein shown, the member 3 is mounted in fixed position on the bed adjacent one end thereof and the member 4 is slidable on the bed and is guided for longitudinal movement along the way 2. The work pressing member 4 may be moved toward and away from the work pressing member 3 by means of a suitable motor such as a reciprocating piston operated by a fluid pressure cylinder.

As best shown in Figs. 1 and 4, the work pressing members 3 and 4 are provided with axially alined bores 7 and 8 that are parallel to the way 2. At their opposed faces the work pressing members 3 and 4 have counterbores 9 and 10, the counterbore 9 forming a socket to receive a sleeve B and the counterbore 10 providing a socket in which an end of the insert A fits. The counterbore 9 is of a depth to receive substantially the entire sleeve B and may be provided with a removable stop sleeve 11 for engagement with the sleeve B, the stop sleeve 11 being readily removable and replaceable with other stop sleeves of different lengths to accommodate longer or shorter sleeves.

The work pressing members 3 and 4 serve to force the rubber insert A into the sleeve B and, in order to enable this to be done while the movable member 4 moves into engagement with the stationary member 3, means is provided for supporting an insert A and a sleeve B in axial alinement between the members 3 and 4. The insert and sleeve supporting means comprises retractable supporting elements that are movable into positions between the work pressing members 3 and 4 when the work pressing members are separated.

As most clearly shown in Fig. 1, the stationary work pressing member 3 carries a supporting element 12 that forms part of its clamping face, the part 12 having a top face in the plane of the axis of the counterbore 9 and being mounted on a pair of pistons 13 disposed parallel to the bed 1 and to the axis of the counterbore 9, the pistons 13 being slidable in cylinders 14 to a position inwardly of the clamping face of the member 3. Since the top of the supporting element 12 conforms to the lower half of the counterbore 9, it provides a sleeve-receiving seat 12a on which a sleeve B may be supported in axial alinement with the counterbore 9.

The movable work pressing member 4 carries a retractable supporting element 15 that forms the lower part of its clamping face and that has a top face in the plane of the axis of the counterbore 10. The supporting element 15 is mounted on a pair of pistons 16 that are parallel to the bore 8 and that slide in cylinders 17 formed in the member 4. Since the top of the element 15 conforms to the lower half of the counterbore 10, it provides a concave insert-receiving seat 15a. During operation of the machine, air under pressure is supplied to the cylinders 14 and 17 for yieldably pressing the supporting elements 12 and 15 toward one another so that the supporting elements 12 and 15 automatically move to sleeve and insert receiving positions when the member 4 is moved away from the stationary member 3.

The bore 8 of the work pressing member 4 is of a diameter but slightly greater than the external diameter of the core C and the member 4 is provided with an opening 18 through which a core C may be entered into the bore 8. A plunger 19 is slidable in the bore 8 toward and away from the stationary work pressing member 3, the plunger 19 when in its retracted position as shown in Fig. 1 being positioned beyond the core-receiving opening 18 so that it may engage with the core C in the bore 8 when it is moved toward the stationary member 3. The plunger 19 slidably fits in the bore 8 and has a core-receiving end portion 20 of reduced diameter which enters the core as shown in Fig. 4 during movement of the plunger toward core-inserting position. At its inner end the plunger has a tapered pilot portion 21 that is integral with the portion 20.

The plunger 19 may be reciprocated once during each cycle of operation of the machine by any suitable mechanism, such for example as a reciprocating slide and a crank that is rotated by a crankshaft through a one-revolution clutch.

Adjacent the stationary work-pressing member 3, the bed 1 is provided with alined transverse ways 23 disposed at right angles to the path of travel of the work-pressing member 4, and these ways carry identical oppositely-movable work-positioning slides 24 that are movable into the space between the work pressing members 3 and 4 when the work pressing member 4 is in its retracted position. The slides 24 are mounted for reciprocation parallel to the ways 23 and may be reciprocated by a fluid motor or any other suitable motor means. Such motor holds the slides 24 in their retracted positions and thereafter moves the slides 24 inwardly toward the supporting members 12 and 15 with which the slides 24 engage when in their innermost positions.

Each slide 24 has an insert-positioning portion 25 provided with recesses 26 that conform to the large end a of the insert A and that overlie the seat 15a on the supporting member 15. The insert-positioning portions 25 also have projections 27 that extend into the space between the retractable supporting members 12 and 15 closely adjacent the face of the supporting member 15, the projections 27 being shaped to receive the body portion of an insert A to support the insert in axial alinement with the socket 9. The slides 24 also have sleeve-positioning portions 28 that are brought into position overlying the retractable sleeve-supporting member 12 and that are provided with recesses 29 that conform to the flanged ends b of the sleeve B. When the slides 24 are in their innermost positions, the positioning members 25 and the retractable supporting member 15 provide a receiving pocket for a rubber insert A in which the insert will be supported in axial alinement with the bores 7 and 8 of the work pressing members. The sleeve positioning portions 28 of the slides together with the retractable supporting member 12, form a receiving pocket for a sleeve B in which a sleeve B will be supported in axial alinement with the bores 7 and 8 of the work-pressing members and also in axial alinement with an insert A in the pocket formed by the portions 25 of the slide 24 and the retractable supporting member 15.

In order to permit the work pressing member 4 to move into engagement with the stationary member 3, it is necessary to retract the slides 24 prior to movement of the member 4 toward the member 3. The supporting member 12 provides a seat in which the cylindrical body of the sleeve B fits and serves to support the sleeve B and to guide it into the socket 9 when the member 4 exerts pressure on the supporting member 12 to move it inwardly against the pressure of the air in the cylinders 14. The supporting member 15, however, engages only the enlarged portion a of the insert A; and, in order to more adequately support the insert in proper position during the closing movement of the work pressing member 4, an alining pin 30 is provided which is movable through the bore 7, which is in axial alinement with the bores 7 and 8 and which is of a size to fit within an insert A. The alining pin 30 is advanced into engagement with the insert A prior to the retracting movement of the work-positioning slides 24 and serves to guide the insert into engagement with the sleeve B during the closing movement of the movable work pressing member 4. The alining pin 30 may be connected to a suitable reciprocating motor such as a fluid motor having a piston mounted in a cylinder that is axially alined with the bores 7 and 8 of the work pressing members and that is secured to the bed 1.

At the beginning of each cycle of operation of the machine, the work pressing member 4 and the slides 24 are in their retracted positions and the plunger 19 is in its fully retracted position where its core-receiving end 20 is clear of the core-receiving opening 18 in the member 4. The alining pin 30 is also in retracted position. The slides 24 are first moved inwardly to their sleeve and insert-receiving position; and, after a sleeve and insert have been positioned on the seats 12a and 15a and a core inserted into the bore 8 through the opening 18, the alining pin 30 is advanced into engagement with an insert on the seat 15a, the slides 24 are retracted and the motor is energized to move the work pressing member 4 toward the stationary member 3. During this movement of the work pressing member, the insert A is slid along the alining pin 30 into engagement with the sleeve B on the seat 12a and the sleeve B is pushed into the socket 9 and the insert A is simultaneously pushed into the sleeve B as shown in Fig. 4, after which the pin 30 is retracted and the plunger 19 is advanced to force a core C into the insert A as shown in Fig. 5.

During the final closing movement of the movable work pressing member 4, the plunger 19 is moved toward the stationary work pressing member 3, past the opening 18 where it picks up a core C and positions it on the reduced end portion 20 so that upon continued movement the core will be forced into the insert as shown in Fig. 5. The leading end of the core C forms a shoulder that would normally engage with the insert A and greatly increase the resistance to the passage of the core into the rubber insert. To eliminate this difficulty means may be provided for delivering a fluid, such as a liquid under pressure, radially against the interior of the rubber insert A immediately in advance of the leading end of the core C as for example in said copending application or other suitable means may be provided for expanding portions of the insert radially in advance of said leading end to facilitate entry of the core.

However, such means are unnecessary with the insert A of the present invention. Since a fluid supply means for the plunger 19 is unnecessary where the machine is assembling bushings with the rubber insert A of the present invention, the plunger 19 and the tapered pilot 21 thereof shown in the drawings is slightly different from the plunger 19 and pilot 21 shown in the aforesaid application Serial No. 370,783. As herein shown, the large end of the tapered pilot 21 is of substantially the same diameter as the externally cylindrical core-receiving portion 20 of the plunger 19 and said pilot 21 and said portion 20 are substantially the same size and shape as the pilot 21 and the portion 20 of the plunger 19 shown in the aforesaid copending application, but unlike the latter plunger the pilot 21 is integral with the cylindrical portion 21 and does not contain fluid passages. The core C may be entered into the rubber insert A of the present invention without damage to the insert. Since the large end of the tapered pilot 21 is of the same diameter as the core-receiving portion 20 of the plunger, the plunger and pilot will pass freely through the core C when the plunger 19 is retracted.

During the retracting movement of the work pressing member 4, an assembled bushing is discharged from the socket 9 by means of an ejector latch 39 that has tooth 40 that engages with the flange b of the sleeve B to pull the assembled bushing out of the socket 9 during the movement of the member 4 away from the member 3 as will be apparent from the drawings. The latch 39 is held by a spring 41 in a position in which the tooth 40 is slightly above the bottom edge of the flange b, and during the closing movement of the movable member 4 the forward end of the latch 39 is moved downwardly by engagement with the flange b of the sleeve B as it moves past the flange b and into a recess 42 formed in the supporting member 12. After the tooth 40 has passed the flange b, it is lifted by the spring 41 to a position where it will engage with the flange b upon retracting movement of the member 4.

While the insert A, sleeve B and core C could be fed to the machine by hand, it is preferable that they be fed automatically, and to this end three chutes 43, 44 and 45 are provided. The chute 43 is shaped to receive a row of sleeves B and is positioned with its discharge end directly over the seat 12a of the retractable supporting member 12. The chute 44 is shaped to receive a row of inserts A and is positioned directly over the seat 15a of the retractable supporting member 15, and the chute 45 is positioned directly over the opening 18. The positioning portions 28 of the slides 24 are directly beneath the chute 43 and provide an extension of the chute when they are positioned over the block 12. Likewise, the positioning portions 25 of the slides 24 form extensions of the chute 44 when they are positioned over the supporting block 15.

A sleeve, an insert and a core are delivered one at a time from each of the chutes 43, 44 and 45; and, in the machine shown herein, the discharge of the three parts to be assembled from the three chutes is simultaneous. The discharge from each of the three chutes may be controlled by suitable means such as solenoid-controlled stop pins or the like to release the lowermost article in each chute while simultaneously arresting movement of the article immediately above the lowermost article so as to prevent the delivery of more than one article at a time. The discharge from the chutes may be timed so as to deliver one sleeve, one insert and one core during each cycle of operation of the machine.

At the end of each cycle of operation of the machine, the member 4, the slides 24, the alining pin 30, and the plunger 19 are all in their fully retracted positions. During the cycle of operation the sequence of operation is as follows:

(a) a motor is energized to move the slides 24 to work-receiving position;

(b) the feed control members for the three chutes 43, 44 and 45 are simultaneously actuated to discharge a sleeve, an insert and a core simultaneously, the sleeve B being delivered to the seat 12a, the insert A being delivered to the seat 15a, and the core C being delivered through the opening 18 into the bore 8;

(c) immediately after delivery of the sleeve, insert and core to the machine, the positioning pin 30 is advanced into engagement with the insert A supported by the positioning portions 25 of the work positioning slides 24 and the slides 24 are immediately moved to their retracted positions;

(d) after the slides 24 have been moved out of the path of the member 4, a motor is energized to move the member 4 toward the member 3 to move the insert into engagement with the sleeve and to press the sleeve into the socket and the insert into the sleeve as shown in Figs. 3 and 4;

(e) before completion of the closing movement of the member 4, the alining pin 30 is withdrawn and a reciprocating stroke is imparted to the plunger 19 to move the plunger and core into engagement with the insert and to force the core into the insert as shown in Fig. 5 of the drawings;

(f) immediately after the insertion of the core, the work pressing member 4 is moved to its retracted position; and (g) when the plunger 19 and work pressing member 4 reach their retracted positions, the cycle of operations is completed, the assembly bushing having been ejected from the machine by the latch 39 during the retracting movement of the member 4.

The tubular elastic and deformable insert of the present invention is designed to facilitate entry of the core C into the insert and to eliminate the necessity of a tapered core pilot or other means to expand the portions of the insert in advance of the leading end of the core during assembly of the resilient bushing.

The resilient bushing shown herein is specifically designed for use on vertically disposed pivots or the like (for example, pivots of the type disclosed in Thiry Patent No. 2,661,969), but it will be understood that the insert A of the present invention may, in the normal unstressed condition, be externally cylindrical throughout its length or may have various other shapes in a bushing or joint designed for such use. It will also be understood that the present invention also applies to various other types of resilient mountings wherein the tubular rubber member is mounted on an inner core with its axis horizontal or otherwise disposed.

Figure 2 is drawn to scale and shows the tubular rubber insert A in the normal unstressed condition prior to assembly in the resilient joint. The insert has a central opening 5 that extends the length of the insert and has an internal cylindrical surface 6 that extends the major portion of said length. The normal diameter of the surface 6 is not substantially different from that of the alining pin 30 but is substantially less than the external diameter of the cylindrical core C. The surface 6 may, for example, have a normal diameter from about ten to twenty percent less than the external diameter of the core so that the insert A must be expanded substantially to receive the core.

In order to facilitate entry of the core during assembly without the use of fluid pressure means or other special means to expand the insert radially in advance of the leading edge of the core, a narrow internal peripheral groove 46 and a thin flexible peripheral lip 47 are provided at the end of the surface 6 first engaged by the core during assembly of the bushing. The groove is located substantially in the plane of juncture of the enlarged portion a and the body portion 56 of the insert A. The lip forms one side of the groove and is pressed toward the groove during entry of the core. The lip 47 is preferably tapered to facilitate entry of the leading end of the core and the groove 46 is preferably filled throughout its circumference with a solid or plastic lubricant 22 to lubricate the exterior cylindrical surface of the core C.

Any suitable rubber-to-metal lubricant may be used in the groove 46, but the lubricant is preferably non-liquid at normal temperatures and preferably is sufficiently viscous so that it holds its shape and stays in and substantially fills the groove when the axis of the insert is in horizontal position. The lubricant may, for example, be mutton tallow or other solid lubricant which does not swell or otherwise damage the rubber substantially. The groove 46 controls the position of the lubricant and the amount thereof and acts as a lubricant reservoir. The lubricant in the groove 46 may be sufficient to permit entry of the core C into the insert A, but it is usually preferable to apply a light weight lubricant to the insert A, the sleeve B and the core C in the conventional manner by fogging or spraying the same as they pass into the assembly machine.

As herein shown, the insert A is annular and has a uniform cross-sectional shape throughout its circumference whereby the groove 46 and the lip 47 are annular. The opening 5 is enlarged from the lip to the end of the insert A to provide a counterbore with an inner surface of revolution 48 for guiding the core C into the insert. The surface 48 includes a cylindrical portion 49 with a diameter greater than that of the surface 6 and substantially equal to the external diameter of the core C and a tapered outward-flaring frusto-conical portion 50 at the mouth of the opening 5. As herein shown, the lip 47 is tapered to provide a frusto-conical shoulder 51 extending from the surface 48 to the radially inner surface 52 of the lip which has the same radius as the surface of revolution 6.

The external surface of the insert A may be generally cylindrical or may have any other suitable shape; but, as herein shown, the insert has an annular enlarged portion a with an annular shoulder 53 which engages the radial flange b of the sleeve B in the assembled bushing. The insert also has a reduced end portion 54 that is tapered to provide a frusto-conical surface 55 with a diameter normally less than the internal diameter of the sleeve B. The insert has a body portion 56 between the end portions a and 54 with a radial thickness, in the normal unstressed condition as shown in Fig. 2, substantially the same as that of the end portion a. However, the radial thickness of the body portion is reduced more than about half when it is compressed between the sleeve and the core so that its thickness in the assembled bushing is not substantially greater than the normal thickness of the end portion 54. A rubber insert embodying the present invention may, for example, increase in length more than 50 percent and even as much as 150 percent or so when it is placed under radial compression between a rigid sleeve and a rigid core.

As herein shown, the body portion 56 has an external cylindrical surface 57 substantially throughout its length and an annular shoulder 58 extending radially from the frusto-conical surface 55. The diameter of the surface 57 is not substantially different from the internal diameter of the sleeve B so that the rubber insert A may easily be inserted into the sleeve without compressing the rubber substantially. However, the sleeve is preferably tapered or enlarged slightly at its flanged end to facilitate entry of the rubber insert. As herein shown, the internal surface of the sleeve is in the form of a surface of revolution 59 having a cylindrical portion 60 extending the major portion of the length of the sleeve and having a cylindrical portion 61 of slightly greater diameter adjacent the flange b. The surface of revolution 59 extends the length of the sleeve and, in the assembled bushing has a length substantially equal to that of the radially compressed body portion 56 as shown in Fig. 5.

The inner surface 6 of the insert is of substantially smaller diameter than the outer diameter of the inner sleeve or core C. Since the diameter of the outer surface 57 of the insert A is not greatly different from the diameter of the inner surface 60 of the sleeve B, radial compression of the insert shown herein is achieved almost entirely through expansion of its inner diameter and its outer diameter remains substantially unchanged. The outer surface of the insert adjacent the enlarged portion a thereof is therefore not stressed in radial tension relative to the flange and a harmful plane of stress concentration is eliminated which might tend to cause radial shear of the rubber. Also the high stress in the radially inner portion of the insert causes it to adhere tightly to the core C.

An advantage of the insert shown herein is that it may easily be inserted into the sleeve B before the core C enters the insert.

It will be understood that, in accordance with the provisions of the patent statutes, variations and modifications of the specific rubber insert shown and described herein may be made without departing from the spirit of the present invention and that the rubber member or insert may be assembled in a resilient mounting in various ways in addition to those specifically disclosed herein.

Having described my invention, I claim:

1. A tubular elastic rubber member having a central opening therein, a lubricant groove in said member around the periphery of said opening and spaced from the end of said member, and a thin flexible lip forming one side of said groove, said opening being enlarged outwardly of said lip.

2. A tubular rubber insert for a resilient mounting having a rigid sleeve and a rigid core for engaging the outer and inner surfaces of said insert, said insert in the normal and unstressed condition having a radial thickness greater than the distance between said sleeve and said core and having an internal peripheral surface with a peripheral groove therein, said surface having a diameter on one side of said groove greater than the diameter of the surface on the other side of said groove and having a tapered peripheral shoulder adjacent said groove.

3. A tubular elastic and deformable insert for a resilient mounting having an inner rigid core with an external cylindrical surface, said insert having an inner substantially cylindrical surface with a diameter normally less than that of said external surface for gripping said external surface and having a narrow peripheral groove near one end of said inner surface, one side of said groove being formed by a flexible peripheral lip that is tapered to facilitate entry of said core into said insert.

4. A tubular rubber insert for a resilient mounting having a rigid outer sleeve and a rigid inner core for engaging the outer and inner surfaces of said insert, said insert when unstressed having portions with coaxial substantially cylindrical internal surfaces of different diameter and an annular shoulder between said surfaces, and an annular lubricant groove in one of said portions spaced a short distance from the cylindrical surface of greater diameter to provide a flexible annular lip at said shoulder, said lip being tapered to guide the leading edge of said core when it is moved through the cylindrical surface of larger diameter to the cylindrical surface of smaller diameter.

5. A tubular rubber insert for a resilient mounting having a rigid outer sleeve with a radially extending flange and a rigid inner core coaxial with said sleeve for gripping the outer and inner surfaces of said insert, said insert having a volume greater than the volume of the space between said core and said sleeve so that the end portions of the insert will extend beyond the opposite ends of said sleeve when the insert is compressed radially between said core and said sleeve, one of the end portions of said insert being enlarged for engagement with the radial flange of said sleeve, said rubber insert having means including a groove and a flexible lip to facilitate entry of said core during assembly of the mounting.

6. An insert as defined in claim 5 wherein said insert in the normal unstressed condition has a generally cylindrical surface on one side of said lip with a diameter not greatly different from the external diameter of said core and a generally cylindrical surface of smaller diameter on the opposite side of said lip.

7. An elastic tubular rubber insert having portions with coaxial cylindrical internal surfaces of different diameter, an annular shoulder between said surfaces, and an annular lubricant groove in one of said portions spaced a short distance from the cylindrical surface of greater diameter to provide a thin tapered flexible annular lip at said shoulder.

8. A tubular elastic rubber member having a central opening with an internal generally cylindrical surface of substantial axial length and a thin tapered flexible peripheral lip at one end of said surface having an axial length which is a small fraction of the axial length of said cylindrical surface.

9. The herein described method of making a resilient mounting comprising providing an elastic tubular insert having adjacent annular portions with coaxial substantially cylindrical internal surfaces of different diameter and an annular shoulder between said surfaces, forming an annular lubricant groove in one of said portions spaced a short distance from the cylindrical insert surface of greater diameter to provide a flexible annular lip at said shoulder, filling said groove with a plastic rubber-to-metal lubricant, mounting said insert within a rigid outer member having an internal surface of revolution with a diameter not substantially greater than the normal diameter of said insert so that the insert engages the outer member throughout its periphery and throughout the major portion of the length of the insert, providing an inner rigid cylindrical sleeve of uniform thickness having an external diameter materially greater than the diameter of the cylindrical insert surface of smaller diameter and not substantially less than that of the cylindrical insert surface of greater diameter and having an axial length greater than that of said insert, mounting said sleeve on a plunger having a reduced cylindrical end portion with an external diameter corresponding substantially to the internal diameter of said sleeve, supporting said plunger and said sleeve in axial alignment with said tubular insert and moving the same toward the insert so that the edge of said sleeve engages and rides over said lip to squeeze the lubricant out of said groove as the sleeve enters and expands the portion of the insert having the larger internal diameter, said insert being expanded solely by said sleeve and placed under radial compression, the axial movement of said sleeve being continued until said edge of the sleeve reaches the end of the insert to complete assembly of the mounting, and removing said plunger from the end portion of said sleeve.

10. The herein described method of making a resilient mounting comprising providing an elastic tubular rubber insert having adjacent annular portions with coaxial substantially cylindrical internal surfaces of different diameter and an annular shoulder between said surfaces, forming an annular lubricant groove in one of said portions spaced a short distance from the cylindrical insert surface of greater diameter to provide a flexible annular lip at said shoulder, filling said groove with a rubber-to-metal lubricant, mounting said insert within a rigid outer sleeve having an internal surface of revolution of a size to fit the insert, inserting a rigid externally cylindrical core within the cylindrical insert surface of greater diameter, said core having a uniform diameter throughout its length not substantially greater than the diameter of said cylindrical insert surface of greater diameter and materially greater than the diameter of the cylindrical insert surface of smaller diameter, and completing assembly of the mounting by moving the core axially into engagement with said lip and past said lip while simultaneously squeezing the lubricant from said groove so that the internal surface of said insert is expanded solely by said core and the insert is compressed radially and elongated axially between said core and said outer sleeve.

References Cited in the file of this patent

UNITED STATES PATENTS

| | | |
|---|---|---|
| 1,739,270 | Thiry | Dec. 10, 1929 |
| 2,324,984 | Brown | July 20, 1943 |
| 2,534,738 | Scott | Dec. 19, 1950 |
| 2,643,147 | Funkhouser | June 23, 1953 |
| 2,661,969 | Thiry | Dec. 8, 1953 |
| 2,676,040 | Dalton | Apr. 20, 1954 |